(12) United States Patent
Wheatley et al.

(10) Patent No.: US 12,345,405 B2
(45) Date of Patent: Jul. 1, 2025

(54) HEATED LIGHT PAD

(71) Applicant: Siser NA, Sterling Heights, MI (US)

(72) Inventors: David Wheatley, Sterling Heights, MI (US); Keith Allison, Sterling Heights, MI (US); Micah Leong, Sterling Heights, MI (US); Maya Groscurth, Sterling Heights, MI (US)

(73) Assignee: Siser NA, St. Clair Shores, MI (US)

( * ) Notice: Subject to any disclaimer, the term of this patent is extended or adjusted under 35 U.S.C. 154(b) by 840 days.

(21) Appl. No.: 17/502,154

(22) Filed: Oct. 15, 2021

(65) Prior Publication Data

US 2022/0136691 A1    May 5, 2022

Related U.S. Application Data

(60) Provisional application No. 63/109,919, filed on Nov. 5, 2020.

(51) Int. Cl.
*F21V 33/00* (2006.01)
*B32B 17/06* (2006.01)
(Continued)

(52) U.S. Cl.
CPC ............ *F21V 33/008* (2013.01); *B32B 17/06* (2013.01); *B32B 17/10* (2013.01); *B32B 27/08* (2013.01); *B32B 27/308* (2013.01); *B32B 27/36* (2013.01); *G02B 6/0051* (2013.01); *G02B 6/0055* (2013.01); *G02B 6/0073* (2013.01); *H05B 1/02* (2013.01); *H05B 3/84* (2013.01); *B32B 2307/304* (2013.01); *B32B 2307/412* (2013.01);
(Continued)

(58) Field of Classification Search
CPC ....... B32B 15/00; B32B 15/082; B32B 15/09; B32B 17/06; B32B 17/10; B32B 2255/10; B32B 2307/208; B32B 2307/302; B32B 2307/304; B32B 2307/412; B32B 2307/414; B32B 2307/416; B32B 2457/00; B32B 27/08; B32B 27/281; B32B 27/308; B32B 27/36; B32B 27/365; B32B 3/06; G02B 6/0051; G02B 6/0055; G02B 6/0073; G02B 6/0095; H05B 1/02; H05B 1/0252; H05B 2203/013; H05B 3/286; H05B 3/84; F21V 33/008
USPC ..................................................... 219/220
See application file for complete search history.

(56) References Cited

U.S. PATENT DOCUMENTS 5,375,536 A    12/1994 Peters
9,586,313 B2    3/2017 Robinson et al.
(Continued)

OTHER PUBLICATIONS

Snider, CN 102510291 A (Year: 2012).*
(Continued)

*Primary Examiner* — Vy T Nguyen
(74) *Attorney, Agent, or Firm* — Fishman Stewart PLLC

(57) ABSTRACT

The present application describes a heated light pad. The heated light pad includes housing including a top cover having a work surface and a bottom cover enclosing a housing interior. A light source and a heater are each disposed in the housing interior. The light source is structured and arranged to illuminate the work surface, and wherein the heater is structured and arranged to heat the work surface. According to an example, the light source and the heater are operable simultaneously and independently of one another.

20 Claims, 2 Drawing Sheets

(51) Int. Cl.
    *B32B 17/10*     (2006.01)
    *B32B 27/08*     (2006.01)
    *B32B 27/30*     (2006.01)
    *B32B 27/36*     (2006.01)
    *F21V 8/00*     (2006.01)
    *H05B 1/02*     (2006.01)
    *H05B 3/84*     (2006.01)

(52) U.S. Cl.
    CPC ..... *B32B 2307/416* (2013.01); *B32B 2457/00* (2013.01); *H05B 2203/013* (2013.01)

(56) References Cited

U.S. PATENT DOCUMENTS

| | | | | |
|---|---|---|---|---|
| D928,978 S | * | 8/2021 | Ye | D26/93 |
| 2012/0176555 A1 | * | 7/2012 | Kasai | G02F 1/133605 |
| | | | | 348/739 |

OTHER PUBLICATIONS

Ye, CN 109212807 A (Year: 2019).*
Seo, KR 20080005759 A (Year: 2008).*
Tang, KR 20140056059 A (Year: 2014).*
US Art Supply LED Lightbox Board, <<https://usartsupply.com/collections/lightpads/products/usa-lm-202>>, Sep. 18, 2020.
CraftHTV Heated Weeding Panel, <<https://crafthtv.com/products/heated-weeding-panel>>, Sep. 18, 2020.
Cricut Brightpad, <<https://cricut.com/en_us/cricut-brightpadtm-mint.html>>, Sep. 24, 2019.
Artograph LightPad LX 940, <<https://www.artograph.com/lightpad-series/lightpad-lx-940/>>, Sep. 25, 2019.

* cited by examiner

HEATED LIGHT PAD

CROSS-REFERENCE TO RELATED APPLICATION

This application claims priority to and the benefit of U.S. Provisional Patent Application Ser. No. 63/109,919, filed on Nov. 5, 2020, the contents of which are hereby incorporated by reference in their entirety.

TECHNICAL FIELD

The present disclosure relates generally to a table or pad for weeding heat transfers, and more particularly to a heated light pad that provides a work surface that is both illuminated and heated.

BACKGROUND

Lettering, logos, and designs applied to substrates such as fabrics and hard surfaces are often made as heat applied transfers. Heat transfer lettering and designs are cut from a sheet of multi-layer material. The top layer is comprised of the material used for the letters and designs themselves, and may include for example a heat transfer vinyl (HTV) which is a sheet of material with a heat activated adhesive backing. The HTV is provided on a carrier comprising a sheet of plastic material that is typically sticky or tacky. Once the outline of the letters and designs are cut into the top layer, the unwanted material around the letters and design must be removed from the carrier, and any cavities in the letters and design (e.g., the middle hole in the letter "O" or "A") must be plucked out. This process is referred to as weeding, the removal of unwanted material in and around a desired design. Weeding is commonly performed manually with a hand-held weeding tool.

Traditionally, weeding away unwanted material in and around a desired design, referred to as scrap, has been a time consuming and laborious process. For example, some materials can be difficult to remove large areas of scrap due to the high tackiness of the carrier. Any difficulty in weeding away scrap can lead to the desired design being pulled/stretched and rendered unusable. Additionally, with some materials the cut lines (e.g., outline of the letters and designs cut into the top layer of the multi-layer material) can be very difficult to see, which may cause individuals to weed away unintended materials and/or distorting/stretching the desired design.

Thus, there exists room for improvement in the field of weeding.

BRIEF DESCRIPTION OF THE DRAWINGS

While the claims are not limited to a specific illustration, an appreciation of the various aspects is best gained through a discussion of various examples thereof. Although the drawings represent illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrates are described in detail by referring to the drawings as follows:

DETAILED DESCRIPTION

Figure 1:
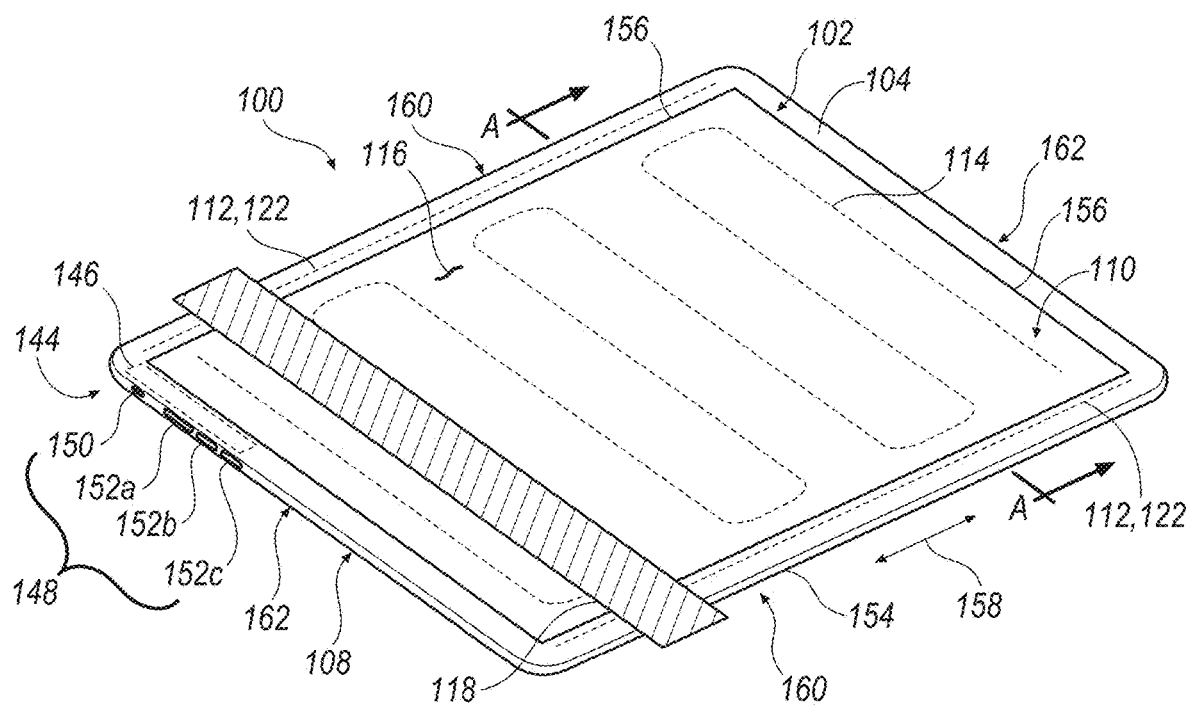
FIG. 1 illustrates a perspective view of a heated light pad according to an example.

In the drawings, where like numerals and characters indicate like or corresponding parts throughout the several views, exemplary illustrates are shown in detail. The various features of the exemplary approaches illustrated and described with reference to any one of the figures may be combined with features illustrated in one or more other figures, as it will be understood that alternative illustrations that may not be explicitly illustrated or described may be able to be produced. The combinations of features illustrated provide representative approaches for typical applications. However, various combinations and modifications of the features consistent with the teachings of the present disclosure may be desired for particular applications or implementations.

The present disclosure describes a portable or semi-portable (e.g., battery powered) heated light pad that provides a work surface that is both illuminated and heated. The heated light pad makes weeding away excess or scrap material in and around a desired design that has been cut on a multi-layered material quicker by warming up the adhesive backing so that the scrap material comes off of the carrier easier. The addition of a light makes cut lines easier to see so that users know what to weed away.

According to a first aspect, there is provided a heated light pad including a housing, a light source, and a heater. The housing includes a top cover having a work surface and a bottom cover that together enclose a housing interior. The light source and the heater are disposed in the housing interior for illuminating and heating the work surface, respectively. The light source and the heater are configured as disparate components, and the heater is designed such that it does not generate visible light or otherwise illuminate the work surface.

According to an implementation, the housing includes concave side walls extending from the top cover to the bottom cover. Additionally or alternatively, the side walls may extend inclined inwards towards the bottom cover. The concave and/or inwardly inclined side walls provide a smaller base in comparison to the work surface, such that the top cover has an area (length by width of the top face) that is larger than that of the bottom cover (length by width of the bottom face). Such a configuration allows users to better grip the heated light pad and gives the illusion of a thinner siding or frame.

A clip may be mounted on the top cover to hold material down against the work surface for even lighting and/or heating. The clip includes at least one hook member structured and arranged to engage at least one of the side walls via a snap-fit connection. With the provision of concave side walls, the clip can be easily snapped into place onto the sides of the housing anywhere transversely across the work surface.

Additionally or alternatively, at least one magnetic plate may be arranged underneath the top cover outside of a perimeter of the work surface, e.g., between the side walls and the work surface so as to border the perimeter of the work surface. The magnetic plate may extend along one or more sides of the work surface so as to attract with a magnet that may be used to hold down materials against the top cover.

Pursuant to an implementation, the light source comprises a light emitting diode (LED) mounted on a light guide plate. In an example, the light source includes one LED strip arranged to extend along a long side of the work surface. In another example, the light source includes two LED strips arranged to extend along two long sides of the work surface and at opposite sides or edges of the light guide plate. The light guide plate is configured to direct light from the LEDs out the top of the plate in a direction towards the work surface to provide uniform lighting, and microstructures (e.g., microprisms or etched lines) may be provided on the bottom of the light guide plate to facilitate an even and uniform transmission of light. With the provision of the light guide plate, the LED strip(s) may be positioned outside of a perimeter of the work surface to help reduce bright and dark areas.

A light diffuser or light diffusion sheet may be positioned above the LEDs mounted on the light guide plate, e.g., between the top cover and the light source, to help diffuse the light emitted from the light source and provide a constant glow of illumination along the entire length of the work surface. The diffuser sheet may be formed of a plastic material, e.g., an acrylic or a polycarbonate, or of a glass material. Additionally or alternatively, a light reflector or light reflective sheet may be positioned below the LEDs mounted on the light guide plate, e.g., between the light source and the bottom cover. The light reflector reflects light exposed from the bottom of the LED strip back to the light guide plate to increase the efficiency of the light source.

The heater is configured to heat the work surface to a temperature sufficient to soften the adhesive on the carrier of the heat transfer material and/or improve the pliability of the material to facilitate weeding. The heater may heat the work surface to a temperature of approximately 100° F. or more to sufficiently weaken the bond between the heat transfer material and its carrier. For example, the heater may heat the work surface to a temperature of approximately 110° F. for finely detailed designs up to a temperature of approximately 130° F. for larger weeding projects, although other temperatures may be used.

Pursuant to an implementation, the heater includes a polymer thick film (PTF) heater. In this case, the PTF heater may be arranged below the light source between the light reflective sheet and the bottom cover or optionally a thermal insulation disposed on the bottom cover, so as to avoid blocking light emitted from the LEDs. The PTF heater may comprise a heating element, e.g., an electrically resistive wire, conductive and resistive inks, positive temperature coefficient (PTC) elements, incorporated (e.g., embedded or encapsulated) into a polymer film substrate such as polyester or polyimide. The heating element may extend generally across the entire area of the work surface, to provide even and uniform heating.

Pursuant to another implementation, the heater includes an optically clear heater. In this case, the optically clear heater may be arranged above the light source due to its transparent characteristics, for example between the top cover and the light diffusion sheet. The optically clear heater may comprise a layer of electrically conductive transparent film (e.g., a polyester sheet incorporating indium tin oxide (ITO)) with bus bars disposed on the transparent film in parallel. The optically clear heater is generally transparent to light, with an electrical resistance that provides heat when powered. The provision of an optically clear heater may provide the benefit of being positioned in closer contact to the work surface in comparison to the PTF heater, thereby increasing the efficiency of heat transmission to the work piece (e.g., HTV material).

Provision may be made for a controller or power controller such as a circuit board disposed in the housing interior and operatively connected to the light source and the heater, for powering and controlling the light source and the heater. The controller may be programmed/configured to selectively control the light source and the heater independently and simultaneously of one another. Depending on a user selection via a control interface, e.g., control/power buttons, the controller can be configured to output power to the light source only, the heater only, or both the light source and the heater simultaneously.

Pursuant to an implementation, the controller is programmed/configured to adjust a temperature output of the heater and a light output/intensity of the light source. For example, the light source and the heater may each be adjustable between a plurality of settings including low, medium, and high settings that a user can independently click through to reach their desired intensity for either light or heat.

According to a second aspect, there is provided a heated light pad including a top cover having a work surface, a bottom cover, a light source for illuminating the work surface, and a heater for heating the work surface. The light source and the heater are operable simultaneously and independently of one another. A light diffusion sheet is arranged between the top cover and the light source, a light reflective sheet is arranged between the light source and the bottom cover, and a thermal insulation is arranged between the light reflective sheet and the bottom cover.

Pursuant to an implementation, the heater includes a polymer thick film (PTF) heater arranged between the light reflective sheet and the thermal insulation. The PTF heater includes, for example, an electrically resistive heating element incorporated into a polymer film substrate layer.

Pursuant to another implementation, the heater includes an optically clear heater arranged between the light source and the light diffusion sheet. The optically clear heater includes, for example, parallel bus bars disposed at edges of an electrically conductive transparent film.

The heated light pad can include a controller or power controller (e.g., a circuit board) operatively connected to the light source and the heater, the controller being programmed/configured to power the light source and the heater simultaneously and independently of one another. Pursuant to an implementation, the controller is configured to adjust a temperature output of the heater and a light output of the light source. For example, the controller may be configured to provide a predetermined amount of low, medium, and high power to the heater for low, medium, and high temperature settings, respectively. Additionally or alternatively, the controller may be configured to provide a predetermined amount of low, medium, and high power to the light source for low, medium, and high light intensity settings, respectively.

The light source may include parallel LED lighting strips arranged at edges of a light guide plate. The light guide plate with the side mounted LED strips may be arranged between the light diffusion sheet and the light reflective sheet.

The heated light pad may include a side frame having side walls connecting the top cover to the bottom cover. The side frame may be formed integrally with the top cover, integrally with the bottom cover, or provided as a separate component. The side walls may be formed concave and/or inwardly inclined towards the bottom cover to provide a smaller base in comparison to the work surface.

Pursuant to an implementation, a clip can be detachably mounted on the top cover and extend transversely across the work surface. The clip can be configured to hold material down against the work surface for even light and/or heating, and snap into place onto the side frame of the heated light pad.

Additionally or alternatively, at least one magnetic plate may be arranged underneath the top cover outside of a perimeter of the work surface. The magnetic plate interacts with a magnet that may be placed on the top cover to hold down the material being weeded.

Implementations of the disclosure may include combinations of the above-described features. Details of these and other aspects of the disclosure will be apparent from the following discussion of but one non-limiting example of a heated light pad.

Figure 2:
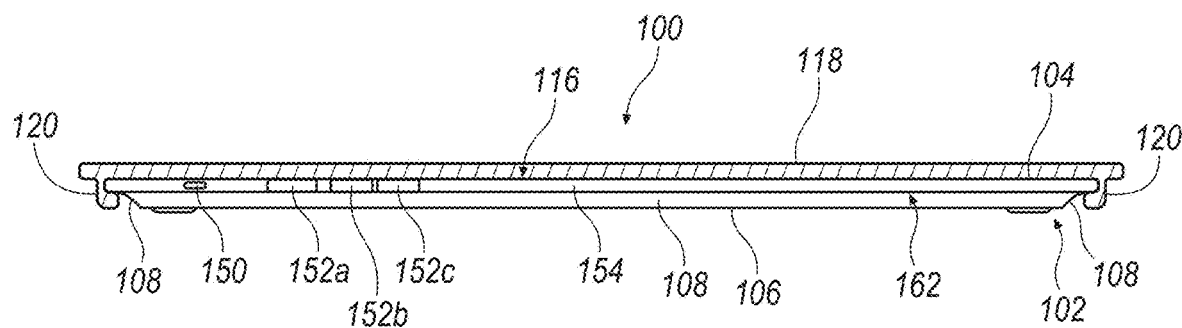
FIG. 2 illustrates a side view of the heated light pad of FIG. 1.

Referring now to FIGS. 1 and 2, an exemplary heated light pad is shown generally at 100. The heated light pad 100 includes a housing 102 provided with a top cover 104 and a bottom cover 106 having side walls 108 that enclose a housing interior 110. The side walls 108 may be integrally formed with the bottom cover 106, such that the bottom cover 106 forms a base frame. A light source 112 and a heater or heating element 114 are disposed in the housing interior 110. The light source 112 and the heater 114 are configured as disparate components, and the heater is designed such that it does not generate visible light.

The top cover 104 has a work surface 116 that is both illuminated and heated. The heater 114 is configured to heat the work surface 116 to a predetermined temperature or temperature range greater than a temperature emitted by the light source 112, as will be discussed further below. The top cover 104 together with the work surface 116 may define a substantially flat or planar top face. Pursuant to an implementation, the top cover 104 and the work surface 116 are formed integrally as a single piece of plastic or tempered glass. Accordingly, the entire area of the top face defined by the top cover 104 together with the work surface 116 may be heated evenly by the heater 114. Additionally, the top cover 104 may have a coating that surrounds or borders a perimeter 156 of the work surface 116 to focus the transmission of light from the light source 112 to the area defined within the perimeter of the work surface 116. For example, the top cover 104 may have an opaque coating that optionally has heat insulating characteristics to form a light and heat boundary around the perimeter 156 of the work surface 116. Pursuant to another implementation, the top cover 104 may be formed separately and border the work surface 116, e.g., the top cover 104 may be formed of plastic and the work surface may be formed of tempered glass. The top cover 104 may have an outer edge or peripheral rim 154 extending transversely (e.g., perpendicularly) to the flat top face, and disposed between the work surface 116 and the side walls 108. The peripheral rim 154 may comprise a colored band that that may be removed and replaced (e.g., interchangeable) with another colored band, to allow the user to customize the appearance of the heated light pad 100. The work surface 116 can have a rectangular shape and thereby define a longitudinal direction 158 with two long or longitudinal sides 160 and two short or lateral sides 162. Further, the work surface 116 may be semi-transparent, or translucent, such that it transmits light but causes sufficient distortion to prevent perception of distinct images within the housing interior 110. For example, the work surface 116 may comprise a pane of frosted glass or frosted plastic. Additionally, the work surface 116 can be or comprise a thermally conductive material to facilitate heating the heat transfer material or HTV disposed thereon. A scratch resistant coating may be disposed on top of the work surface 116 to increase wear resistance during the weeding process.

In the example provided, the housing 102 includes concave side walls 108 (e.g., the side walls 108 are concave externally or on an outer side looking into the interior 110) extending between the top cover 104 and the bottom cover 106. The side walls 108 may be concave along one or both of the long sides 160, and optionally along one or both of the short sides 162. Pursuant to the example shown, the concave side walls 108 extend from the rim 154 of the top cover 104 to base/bottom cover 106 of the housing 102. The concave side walls 108 are inclined inwards towards the bottom cover 106, leading a smaller base 106 in comparison to a top cover 104, allowing users to better grip the heated light pad 100 and creating the illusion of a thinner side frame. Accordingly, the top cover 104 may have an area (e.g., length×width of the top face) that is greater than that of the bottom cover 106.

A clip 118 may be provided to hold down material against the work surface 116 for even lighting or heating. The clip 118 is mounted on the top cover 104 and extends transversely across the work surface 116 (e.g., laterally with respect to the longitudinal direction 158 of the work surface 116). The clip 118 includes at least one hook member 120 structured and arranged to engage at least one of the side walls 108 via a snap-fit connection. The clip 118 and/or the hook member 120 may be formed of a flexible material so that the clip 118 can be easily snapped into place on the sides of the housing 102 and removed as desired. The hook member 120 may have a substantially U-shaped internal contour or cross-section that engages about the rim 154, with the bottom of the hook member 120 engaging underneath the rim 154 and onto the side wall 108. Owing to the concave side walls 108, the bottom of the hook member 120 contacts the side wall 108 underneath the rim 154 with a clearance from the base 106 so that the clip 118 can be easily snapped into place on the sides of the housing 102 anywhere across the work surface 116. According to the example provided, the clip 118 includes two hook member 120 that engage opposing or mutually opposite side walls 108 of the housing 102. The provision of two hook members 120 on opposite sides of the clip 118 permit the clip 118 to be placed at any position along the length (e.g., longitudinally) of the top cover 104. According to another example not shown, the clip 118 may be pivotally attached on one end to the housing 102 and have the hook member 120 at the other end, such that the clip 118 is stationary in the longitudinal direction of the top cover 104. Additionally, more than one clip may be provided on the top cover 104, and the clip 118 may be configured to extend in the longitudinal direction of the work surface 116 in addition or alternatively to the lateral direction as shown in FIG. 1.

The light source 112 can be any suitable light source 112 for illuminating the work surface 116, such as for example a light emitting diode (LED). The LED may be provided in one or more LED strips 122, which may extend along one or both of the long sides 160. In the example provided, the light source 112 includes two LED strips 122 arranged in parallel at the long sides 160 of the top cover 104 and positioned outside of the perimeter 156 of the work surface 116 underneath the opaque coating or material of the top cover 104. The LED strips 122 may extend in the longitudinal direction 158 of the top cover 104 to facilitate uniform and even illumination across the entire area of the work surface 116. It will be appreciated, however, that the LED strip(s) 122 may extend in the lateral direction along one or both short sides 162 without departing from the disclosure.

Figure 3:
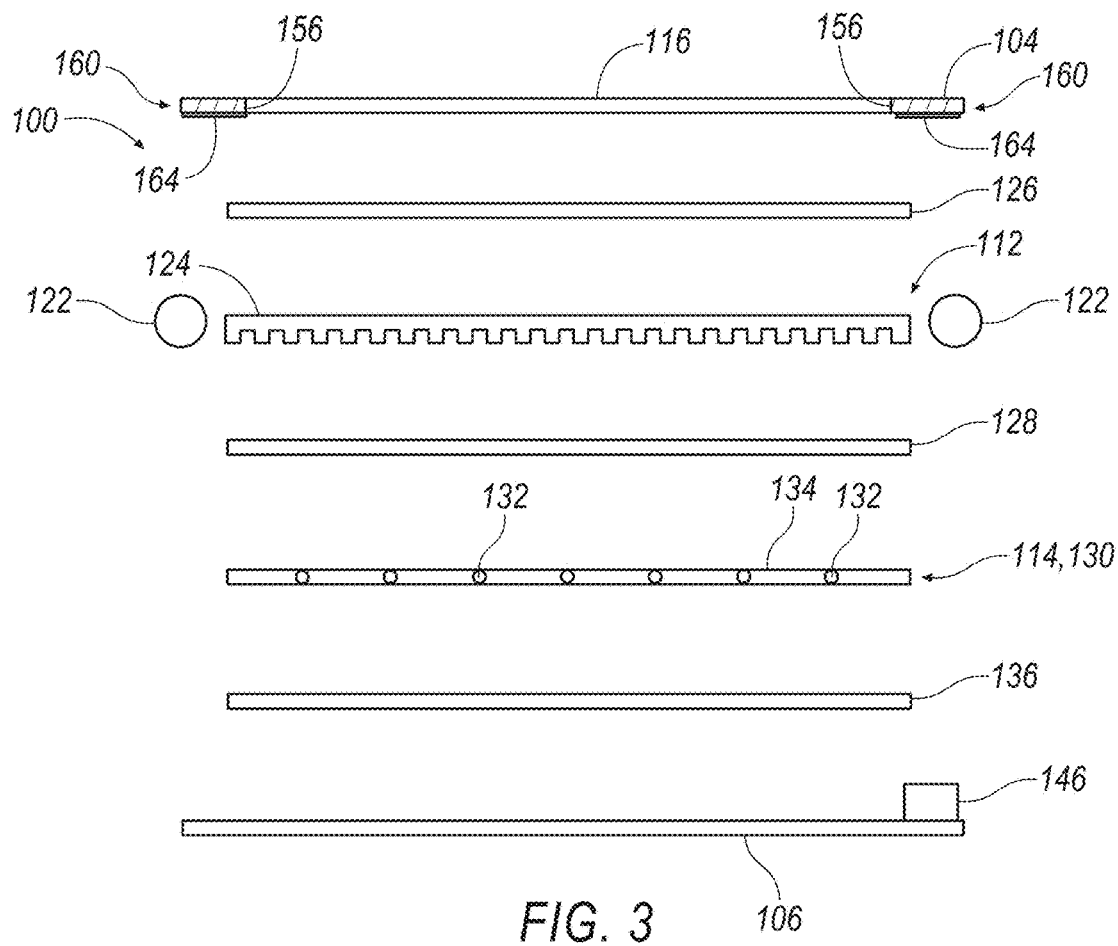
FIG. 3 illustrates a schematic cross-sectional exploded view of the heated light pad of FIG. 1, taken along lines A-A, with the side walls not shown for clarity.
Figure 4:
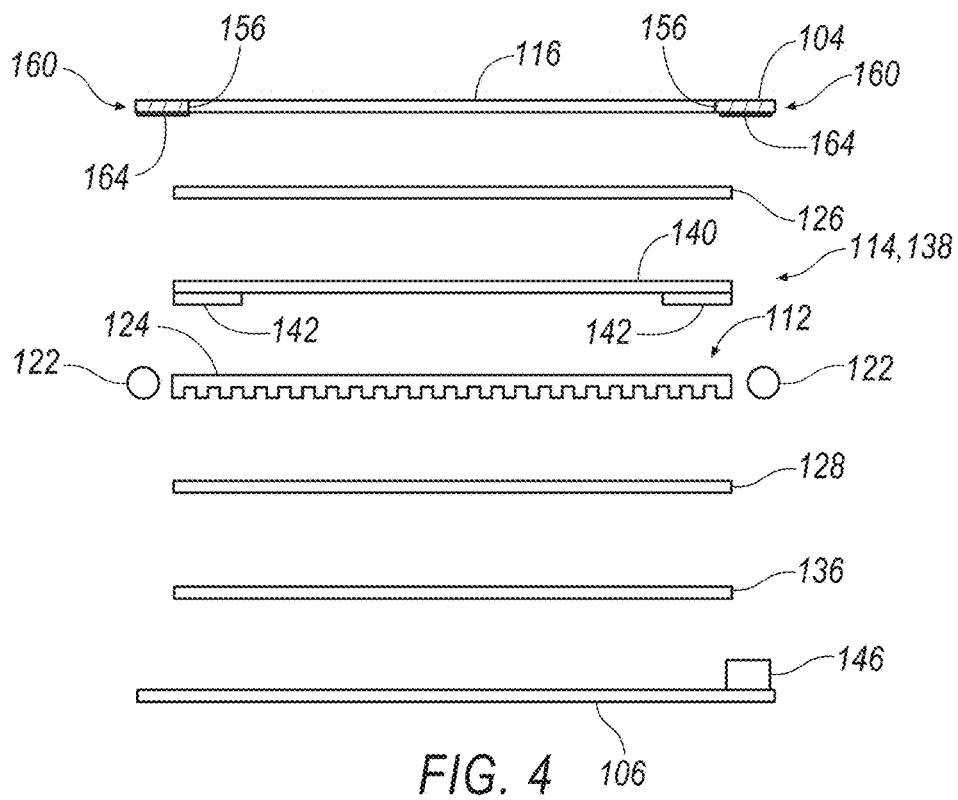
FIG. 4 illustrates a schematic cross-sectional exploded view of another exemplary heated light pad, with the side walls not shown for clarity.

With reference to FIGS. 3 and 4, the LED strips 122 are arranged at sides or edges of a light guide plate 124 (e.g., an acrylic panel such as PMMA (polymethylmethacrylate) or polystyrene (PS)) that has microstructures on the bottom (e.g., matrix of etched lines, called V-cutting, or microprisms) designed to transmit and direct light out the front or top of the light guide plate 124 towards the work surface 116. This arrangement reduces bright and dark areas caused by side mounted LEDs to help provide uniform lighting. A light diffuser or light diffusion sheet 126 may be provided between the top cover 104 and the light source 112 comprising the LED strips 122 and light guide plate 124. The light diffuser 126 may be formed of a plastic material, e.g., an acrylic or a polycarbonate, or of a glass material and may be configured to be illuminated along its entire length in a constant glow of illumination. Additionally or alternatively, a reflective sheet 128 may be arranged between the light source 112 and the bottom cover 106. The reflective sheet 128 receives light emitted from the LED strips 122, and reflects the light exposed from the bottom of the LED strips 122 toward the light guide plate 124 and the diffusion sheet 126. Although FIGS. 3 and 4 show two LED strips 122, it will be appreciated that only one LED strip 122 may be employed without departing from the scope of the disclosure.

Referring to FIGS. 1 and 3, the heater 114 can be any suitable type of electric resistance heating element coupled in heat transmitting relation to the work surface 116. For example, the heater 114 may comprise an electrically resistive wire that heats up when a voltage is generated across it (e.g., a current flows through it). Pursuant to an implementation, the heater 114 comprises a polymer thick film (PFT) heater 130 that includes an electrically resistive heating element 132 (e.g., conductive and resistive inks, electrically resistive wires, positive temperature coefficient (PTC) elements, etc.) incorporated (e.g., embedded or encapsulated) into a polymer film substrate layer 134 (e.g., polyester).

Pursuant to the example shown in FIG. 3 where the heater 114 is configured as a polymer thick film heater 130, the heated light pad 100 has a layered construction, from top to bottom, as follows: the top cover 104 with the work surface 116, the light diffusion sheet 126, the light source 112 comprising the LED strips 122 with the light guide plate 124, the reflective sheet 128, the PTF heater 130, a thermal insulation 136, and the bottom cover 106. In other words, the PTF heater 130 is arranged between the light source 112 and the bottom cover 106 (that is, between the light reflective sheet 128 and the thermal insulation 136), the light diffusion sheet 126 is arranged between the top cover 104 and the light source 112, and the reflective sheet 128 is arranged between the light source 112 and the bottom cover 106. Side walls 108 (not shown for clarity) connect the top cover 104 to the bottom cover 106 along the long sides 160 and the short sides 162.

Pursuant to another example shown in FIG. 4, the heater 114 may alternatively comprise an optically clear heater 138 constructed of a layer of electrically conductive transparent film 140 with bus bars 142 printed in parallel onto the perimeter of the film/sheet 140. Electrically connecting the bus bars 142 to a power source (e.g., power controller 146), e.g., via lead wires (not shown), generates heat as current flows across the film/sheet 140 to generate a uniform heating surface. In the example of FIG. 4, the heated light pad 100 has a layered construction, from top to bottom, as follows: the top cover 104 with the work surface 116, the light diffusion sheet 126, the optically clear heater 138, the light source 112 comprising the LED strips 122 with the light guide plate 124, the reflective sheet 128, the thermal insulation 136, and the bottom cover 106. In other words, the optically clear heater 138 is arranged between the top cover 104 and the light source 112 (that is, between the light source 112 and the light diffusion sheet 126), the light diffusion sheet 126 is arranged between the top cover 104 and the light source 112, and the reflective sheet 128 is arranged between the light source 112 and the bottom cover 106. Side walls 108 (not shown for clarity) connect the top cover 104 to the bottom cover 106 along the long sides 160 and the short sides 162.

With continued reference to FIGS. 3 and 4, a magnetic (e.g., ferromagnetic metal) sheet or plate 164 may be provided along one or more sides of the top cover 104 along the perimeter of the work surface 116. In the illustrated examples, two magnetic plates 164 are provided underneath the top cover 104 outside of the perimeter 156 and along the long sides 160 of the work surface 116. The magnetic plate(s) 164 may be continuous or discontinuous, e.g., provided only in certain regions on the border of the work surface 116. The provision of a magnetic plate 164 permits the use of magnets (not shown), in addition or alternatively to the clip 118, to hold down material being weeded.

The layered components of the heated light pad 100 shown in FIGS. 3 and 4 may be secured via any suitable means, including but not limited to adhesive bonding, welding, fasteners, and form-fit connections.

Returning to FIGS. 1 and 2, a power and control unit 144 may be provided that includes a power controller 146 (cf. FIGS. 3-4), a control interface 148, and a power source electrically coupled to the power controller 146. The power source may comprise a power input 150 that receives a power cord (e.g., to a 120v AC or 220v AC electrical outlet) for powering the power controller 146, although it is contemplated that the power source may include a rechargeable battery to increase portability and ease of use. The power controller 146, such as a circuit board or printed circuit board, may be disposed or fully encased within the bottom cover 106 with the thermal insulation 136 arranged between the controller 146 and the heater 114 for protection. The power controller 146 can be electrically coupled to the control interface 148 and to the light source 112 and the heater 114 (e.g., through non-shown electrical lines), for operating the light source 112 and the heater 114 depending on user selection via the control interface 148. According to an implementation, the power controller 146 is programmed/configured to selectively control operation of the light source 112 and the heater 114 independently and simultaneously of one another. For example, the power controller 146 may activate the light source 112 only, the heater 114 only, or both the light source 112 and the heater 114 at the same time. Additionally or alternatively, the power controller 146 may be programmed/configured to adjust a light output/intensity of the light source 112 and/or a temperature output/intensity of the heater 114 in response to a user input via the control interface 148. For example, the light source 112 and the heater 114 may each be adjustable between a plurality of settings including low, medium, and high settings.

The control interface 148 can be located on a side wall 108 of the housing 102 (e.g., along one of the short sides 162), thereby providing a top cover 104 that is left flat to reduce the risk of accidently pressing a button as well as provide an unobstructed work area. The control interface 148 can be configured to allow a user of the heated light pad 100 to adjust the temperature of the work surface 116 (e.g., by adjusting the amount of power supplied to the heater 114) and/or to adjust a light intensity of the work surface 116 (e.g., by adjusting the amount of power supplied to the light source 112). In the example provided, the control interface 148 includes three buttons 152A, 152B, 152C to control the power supplied to the light source 112 and the heater 114, though other configurations can be used (e.g., switches, touch screens, additional or fewer buttons). The buttons 152A, 152B, 152C can be illuminated to indicate the status of the light source 112 and the heater 114 (e.g., power on, or selected output setting).

Button 152A may correspond to the system power on/off. Buttons 152B and 152C may correspond to light and heat settings, respectively, such that when pressed the light and heat features power on/off and cycle through intensity levels. Either one or both of buttons 152B and 152C may be pressed to operate the light source 112 and heater 114 independently of one another or simultaneously. Further, buttons 152B and 152C may be configured to allow a user to adjust (e.g., increase or decrease) the output of the light source 112 and the heater 114. For example, buttons 152B and 152C may be configured to toggle between low, medium, and high settings such that when, for example, button 152C is pressed the power controller 146 can output a predetermined amount of low power to the heater 114. As a non-limiting example, the low temperature setting can be configured to heat the work surface 116 to a temperature of approximately 110° F., though other temperatures can be used. When button 152C is pressed again, the power controller 146 can be configured to output a predetermined amount of medium power to the heater 114 for a medium temperature setting (e.g., heat the work surface 116 to a temperature of approximately 115° F.), and when button 152C is pressed a third time the power controller 146 can be configured to output a predetermined amount of high power to the heater 114 for a high temperature setting (e.g., heat the work surface 116 to a temperature of approximately 120° F. or 130° F.). In a similar manner, button 152B may be pressed to toggle through low, medium, and high light settings where the power controller 146 is configured to output a corresponding amount of low light, medium light, or high light.

The power and control unit 144 may also include a thermostat shut-off (not shown), such as a bi-metal switch, incorporated into the electrical circuit for the heater 114 that shuts off power to the heater 114 if the temperature of the work surface 116 exceeds a predetermined threshold or shut-off temperature. If the work surface 116 exceeds the predetermined threshold temperature, the thermostat shut-off is tripped and the work surface 116 must cool down below the predetermined threshold temperature before power can be restored to the heater 114. Additionally or alternatively, the power and control unit 144 may have a timer that shuts-off power to the heater 114 and/or the light source 112 after a predetermined period of time.

In operation, a user can place a work piece (e.g., heat transfer material such as HTV) on the work surface 116, which may optionally be clamped to the top cover 104 via the clip 118 and/or via a magnet (not shown) interacting with the magnetic plate 164, while the temperature is elevated and the light source 112 is illuminated. The backlight from the light source 112 highlights the cut lines of the design to make them easier to see, and the heat from the heater 114 softens the adhesive on the carrier as well as improves the pliability of the material. It has been found that the process of weeding heat transfer materials can be made easier when the work piece is at an elevated temperature and backlit, and thus the heated light pad 100 improves the convenience of the manual weeding process.

It will be appreciated that the aforementioned apparatus may be modified to have some components removed, or may have additional components and steps added, all of which are deemed to be within the spirit of the present disclosure. Accordingly, even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed method, device and/or article will be incorporated into such future developments. Thus, the specification and the drawings are to be regarded as an illustrative thought instead of merely restrictive thought.

As used herein, spatial or directional terms such as "top," "bottom," "upper," "lower," "up," "down," and the like, relate to the illustrations shown in the figures and are not to be considered as limiting. Further, all numbers expressing dimensions, ratios and the like, used in the specification and claims, are to be understood to encompass tolerances and other deviations as represented by the term "about" or "approximately." Moreover, all ranges disclosed herein are to be understood to encompass any and all sub-ranges subsumed therein.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. Additionally, use of adjectives such as first, second, etc. should be read to be interchangeable unless a claim recites an explicit limitation to the contrary.

What is claimed is:

1. A heated light pad, comprising:
 a housing including a top cover having a work surface and a bottom cover enclosing a housing interior;
 a light source disposed in the housing interior;
 a heater disposed in the housing interior and disparate from the light source;
 a light reflective sheet arranged between the light source and the bottom cover;
 a thermal insulation arranged between the light reflective sheet and the bottom cover;
 wherein the light source is structured and arranged to illuminate the work surface, and wherein the heater is structured and arranged to heat the work surface; and
 wherein the heater is arranged between the light reflective sheet and the thermal insulation.

2. The heated light pad according to claim 1, wherein the housing includes concave side walls extending between the top cover and the bottom cover.

3. The heated light pad according to claim 2, further comprising a clip mounted on the top cover and extending transversely across the work surface, wherein the clip has at least one hook member structured and arranged to engage at least one of the concave side walls via a snap-fit connection.

4. The heated light pad according to claim 3, wherein the at least one hook member has a U-shaped profile having a bottom end that engages underneath a rim of the top cover with a clearance from the bottom cover.

5. The heated light pad according to claim 1, wherein the housing includes side walls disposed between the top cover and the bottom cover that extend inclined inwards towards the bottom cover.

6. The heated light pad according to claim 1, wherein the light source includes at least one LED strip arranged at a side of a light guide plate, and wherein the at least one LED strip is positioned outside of a perimeter of the work surface.

7. The heated light pad according to claim 1, wherein the heater includes a polymer thick film (PTF) heater.

8. The heated light pad according to claim 7, wherein the PTF heater includes a heating element incorporated into a polymer film substrate.

9. The heated light pad according to claim 8, wherein the heating element includes an electrically resistive wire, a conductive and resistive ink, or a positive temperature coefficient (PTC) element.

10. The heated light pad according to claim 1, further comprising a light diffusion sheet arranged between the top cover and the light source.

11. The heated light pad according to claim 1, further comprising a controller disposed in the housing interior and operatively connected to the light source and the heater, wherein the controller is configured to selectively control the light source and the heater independently and simultaneously of one another.

12. The heated light pad according to claim 11, wherein the controller is configured to adjust a temperature output of the heater and a light intensity of the light source.

13. The heated light pad according to claim 1, further comprising at least one magnetic plate arranged underneath the top cover outside of a perimeter of the work surface.

14. A heated light pad, comprising:
a top cover having a work surface;
a bottom cover;
a light source for illuminating the work surface;
a heater for heating the work surface, the heater being disparate from the light source;
a light diffusion sheet arranged between the top cover and the light source;
a light reflective sheet arranged between the light source and the bottom cover;
a thermal insulation arranged between the light reflective sheet and the bottom cover;
wherein the light source and the heater are operable simultaneously and independently of one another; and
wherein the heater is arranged between the light reflective sheet and the thermal insulation.

15. The heated light pad according to claim 14, wherein the heater includes a polymer thick film (PTF) heater, and wherein the PTF heater includes an electrically resistive heating element incorporated into a polymer film substrate layer.

16. The heated light pad according to claim 15, wherein at least one of:
the electrically resistive heating element includes an electrically resistive wire, a conductive and resistive ink, or a positive temperature coefficient (PTC) element; and
the polymer film substrate layer includes polyester or polyimide.

17. The heated light pad according to claim 14, further comprising a controller configured to adjust a temperature output of the heater and a light output of the light source.

18. The heated light pad according to claim 14, wherein the light source includes at least one LED lighting strip arranged at a side of a light guide plate, and wherein the light guide plate is arranged between the light diffusion sheet and the light reflective sheet.

19. The heated light pad according to claim 14, further comprising a side frame having outer concave walls connecting the top cover to the bottom cover.

20. The heated light pad according to claim 14, further comprising at least one magnetic plate arranged underneath the top cover outside of a perimeter of the work surface.

* * * * *